US012323006B2

(12) United States Patent
Mihaila

(10) Patent No.: US 12,323,006 B2
(45) Date of Patent: Jun. 3, 2025

(54) MAGNET POLE WITH A PLURALITY OF SINGLE MAGNETS HAVING A VARIABLE CROSS-SECTION

(71) Applicant: Whylot SAS, Cambes (FR)

(72) Inventor: Vasile Mihaila, Figeac (FR)

(73) Assignee: Whylot SAS, Cambes (FR)

( * ) Notice: Subject to any disclaimer, the term of this patent is extended or adjusted under 35 U.S.C. 154(b) by 218 days.

(21) Appl. No.: 17/922,932

(22) PCT Filed: May 12, 2021

(86) PCT No.: PCT/IB2021/054057
§ 371 (c)(1),
(2) Date: Nov. 2, 2022

(87) PCT Pub. No.: WO2021/234512
PCT Pub. Date: Nov. 25, 2021

(65) Prior Publication Data
US 2023/0223806 A1  Jul. 13, 2023

(30) Foreign Application Priority Data

May 19, 2020  (FR) .................................. FR2004993

(51) Int. Cl.
*H02K 1/2795*   (2022.01)
*H01F 7/02*   (2006.01)
(Continued)

(52) U.S. Cl.
CPC ......... *H02K 1/2795* (2022.01); *H01F 7/0221* (2013.01); *H01F 41/0253* (2013.01);
(Continued)

(58) Field of Classification Search
CPC .... H02K 1/2793; H02K 1/2798; H02K 21/24; H01F 7/0221; H01F 41/0293
(Continued)

(56) References Cited

U.S. PATENT DOCUMENTS 3,979,619 A * 9/1976 Whiteley ............... H02K 23/04
310/154.06
4,498,048 A * 2/1985 Lee ...................... G01R 33/383
324/309
(Continued)

FOREIGN PATENT DOCUMENTS

CN  109921525 A  *  6/2019
CN  111010008 A  *  4/2020  ............... H02K 1/27
(Continued)

OTHER PUBLICATIONS

FR 3004025 A1 Translation—translation of French Patent No. FR 3,004,025 A1, Makarov et al., Published Oct. 3, 2014 (Year: 2014).*
(Continued)

*Primary Examiner* — Michael Andrews
*Assistant Examiner* — Daniel K Schlak
(74) *Attorney, Agent, or Firm* — Crockett & Crockett, PC; K. David Crockett, Esq.

(57) ABSTRACT

A magnet pole (10) formed by a plurality of elongated single magnets grouped into a bundle, oriented magnetically longitudinally and extending parallel between a front face and a rear face of the magnet pole (10). The elongated single magnets are connected to one another. A first group of single magnets (4) has a larger cross-section or a differently shaped cross-section than at least a second group of at least one single magnet (4 *a*), there being a greater number of single magnets (4) of the first group than the at least one single magnet (41) of the at least one second group.

16 Claims, 4 Drawing Sheets

(51) Int. Cl.
*H01F 41/02* (2006.01)
*H02K 1/2793* (2022.01)
*H02K 1/28* (2006.01)
*H02K 15/03* (2025.01)
*H02K 21/24* (2006.01)

(52) U.S. Cl.
CPC ............ *H02K 1/2793* (2013.01); *H02K 1/28* (2013.01); *H02K 15/03* (2013.01); *H02K 21/24* (2013.01)

(58) Field of Classification Search
USPC .................................................. 310/154.306
See application file for complete search history.

(56) References Cited

U.S. PATENT DOCUMENTS

| | | | | |
|---|---|---|---|---|
| 5,334,899 A * | 8/1994 | Skybyk | ................. | H02K 9/227 310/268 |
| 2011/0080065 A1* | 4/2011 | Watanabe | ............ | H02K 1/2798 310/156.32 |
| 2012/0194025 A1* | 8/2012 | Fubuki | ................... | H02K 15/03 310/156.38 |
| 2012/0262019 A1 | 10/2012 | Smith | | |
| 2013/0175242 A1* | 7/2013 | Lancaster-Larocque | .................... | B28D 1/041 125/35 |
| 2014/0167895 A1* | 6/2014 | Miyata | ................. | H02K 1/2781 335/302 |
| 2014/0375160 A1* | 12/2014 | Zhang | ..................... | H02K 1/06 310/154.26 |
| 2017/0087637 A1* | 3/2017 | Tobita | ................. | H01F 41/0253 |
| 2018/0198335 A1* | 7/2018 | Inoue | ..................... | H02K 16/02 |
| 2019/0305617 A1* | 10/2019 | Brahmavar | ............ | H02K 1/141 |
| 2020/0036236 A1* | 1/2020 | Mihaila | ................... | H02K 1/28 |
| 2021/0013760 A1* | 1/2021 | Enomoto | ............... | H02K 1/148 |
| 2021/0313853 A1* | 10/2021 | Mayeur | .................. | H02K 16/04 |
| 2023/0274880 A1* | 8/2023 | Yao | ........................ | H02K 15/03 29/607 |
| 2024/0055921 A1* | 2/2024 | Kolehmainen | ...... | H02K 1/2796 |

FOREIGN PATENT DOCUMENTS

| | | | | |
|---|---|---|---|---|
| CN | 111049287 A * | 4/2020 | ................ | H01K 1/02 |
| DE | 102012220373 A1 * | 10/2013 | ............... | H02K 1/02 |
| EP | 2306619 | 4/2011 | | |
| EP | 2477312 A1 * | 7/2012 | ......... | H01F 41/0293 |
| EP | 2632027 | 8/2013 | | |
| EP | 2869434 A2 * | 5/2015 | ........... | H02K 1/2773 |
| EP | 3496232 A1 * | 6/2019 | ......... | H01F 41/0253 |
| FR | 2996378 A1 * | 4/2014 | ........... | H02K 1/2793 |
| FR | 3004025 | 10/2014 | | |
| FR | 3004025 A1 * | 10/2014 | ........... | H02K 1/2793 |
| FR | 3014255 | 6/2015 | | |
| FR | 3027468 A1 * | 4/2016 | ........... | H02K 1/2793 |
| FR | 3064419 | 9/2018 | | |
| FR | 3064420 | 9/2018 | | |
| FR | 3072222 A1 * | 4/2019 | ........... | H02K 1/2793 |
| JP | 57107010 A * | 7/1982 | ............. | H01F 7/021 |

OTHER PUBLICATIONS

DE 1020122220373 A1 translation (Year: 2012).*
EP 2869434 A2 translation (Year: 2015).*
FR 2996378 A1 translation (Year: 2014).*
FR 3027468 A1 translation (Year: 2016).*
CN 109921525 A translation (Year: 2019).*
CN 111010008 A translation (Year: 2020).*
CN 111049287 A translation (Year: 2020).*
FR 3072222 A1 translation (Year: 2019).*
JP 57107010 A translation (Year: 1982).*
International Search Report and Written Opinion dated Aug. 11, 2021 from IA PCT/IB2021/054057.

* cited by examiner (Prior Art)

MAGNET POLE WITH A PLURALITY OF SINGLE MAGNETS HAVING A VARIABLE CROSS-SECTION

TECHNICAL FIELD OF THE INVENTION

This invention relates to a magnet pole with a plurality of unit magnets having a variable cross section. This pole or these magnet poles are advantageously intended to be housed in an axial flux electromagnetic machine.

This invention has an advantageous but not restricting application in an electromagnetic motor that delivers high power at a high speed of rotation of the rotor, which is achieved by the specific characteristics of the rotor and the magnets it houses.

A motor of this type can be used, for example, as an electromagnetic motor capable of high speeds of rotation.

PRIOR ART

In high-speed applications it is necessary to have very good mechanical integrity of the rotating part of the electromagnetic machine, i.e. the rotor, to improve its reliability.

For an axial flux electromagnetic machine, the rotor comprises a body in the form of a disc-shaped support for the magnets, having two circular faces connected by a thickness, wherein the disc is frequently bounded between an external rim formed by a rotor binding and an internal periphery bordering a cavity for the rotating shaft.

The magnets are each held in the disc-shaped support by retaining means, whereby a space is left between the magnets.

For high-speed applications, the design of the rotor in an axial flux motor is complex because the forces due to centrifugal effects produce very high mechanical stresses in the rotor.

Additionally, the losses due to Foucault currents become preponderant both in the magnets and also in the rotor when the latter is constructed of materials that are electrical conductors.

For a rotor that is required to rotate at high speeds of rotation, the principal disadvantage of a motor with a high speed of rotation resides in the high probability that the magnet or the magnets will become detached from the rotor, as well as the at least partial breakage of the rotor. The rotor of a motor of this type must therefore be capable of withstanding high speeds of rotation.

One solution can be to construct meshes of elongated single magnets in fiber-reinforced resin structures to reduce the Foucault currents and to use a composite material that does not conduct electricity for the rotor, ideally a glass fiber rotor, with a rotor binding located on the periphery of the rotor to withstand the effects due to centrifugal forces.

FR-A-3 064 420 describes a three-dimensional magnet pole constituted by a plurality of single magnets. The magnet pole incorporates at least one mesh structure that has mesh cells, each of which defines a housing for a respective single magnet, whereby each housing has internal dimensions that are just sufficient to allow the introduction of a single magnet into its interior while leaving a space between the housing and the single magnet which is filled with a fiber-reinforced resin, the mesh cells being made of fiber-reinforced insulating material.

It also possible to adhesively attach the single magnets directly to one another without the interposition of a mesh structure, as described in FR-A-3 064 419, in particular by adhesively connecting the magnets to one another.

These two prior art documents indicate that the single magnets must be shaped so that they occupy as much space as possible in the interior of the magnet pole, leaving only the space necessary for the adhesive or for the mesh structure to ensure the retention of the single magnets in the magnet pole.

The torque that must be produced by an electromagnetic machine is proportional to the surface area of the magnets in interaction with the magnetic fields generated by the stator or stators of the machine. A reduction of the surface area of the magnets therefore results in a decrease in torque and therefore in the power of the machine.

An optimal filling of a magnet pole by the largest number of single magnets is not possible with single magnets that have the same cross section.

FR-A-3 014 255 describes a disc-shaped rotor comprising a plurality of magnet poles located on the peripheral portion of the rotor around a shaft or hub element.

These magnet poles are integrated into a support or cage made of insulating and rigid material to ensure the mechanical integrity of the assembly.

The composite support covers the magnet poles only on their lateral surface and covers the hub only at the level of the periphery of this hub.

In this document, the magnet poles used are not similar to the single magnets of a magnet pole. The composite support must have a stepped shape to retain the magnet poles, which reduces the surface area available for the magnets.

Additionally, the magnet poles extend longitudinally essentially in a plane parallel to the faces of the rotor and not in the direction of the thickness of the rotor.

The magnet poles can have different lengths, so that they can be adapted to the internal configuration defined by the composite support.

The basic problem addressed by this prior art document relates to the retention of the magnet poles in the rotor and not to increasing the torque delivered as the result of an increase in the number of magnets housed in the rotor.

FR-A-3 004 025 describes a magnet pole formed by a plurality of elongated magnet bars, oriented magnetically longitudinally and extending parallel between the lateral faces of the magnet pole and connected to one another one after the other but not into groups.

In this document, the elongated magnet bars are not similar to the single magnets grouped to one another and into bundles forming a magnet pole.

US-A-2012/262019 describes a principal or central magnet with separate magnets located laterally on the opposite sides of the central magnet. However, none of these magnets is constituted by single magnets grouped among themselves into bundles forming a magnet pole.

EP-B1-2 306 619 describes an electromagnetic axial flux rotary machine with a rotor comprising a plurality of permanent magnet segments arranged circumferentially over one surface of a rotor head. These magnet segments are not single magnets grouped into bundles performing a respective magnet pole, but are magnetic bars.

The problem addressed by the invention is to increase the magnetic surface area carried by a rotor by designing one or more magnet poles comprising the largest possible number of single magnets possible, these magnets being grouped into a bundle, which increases the torque delivered by the electromagnetic machine equipped with a rotor carrying a magnet pole or poles of this type.

DESCRIPTION OF THE INVENTION

For this purpose, the present invention relates to a magnet pole formed by a plurality of elongated single magnets grouped to form a bundle, oriented magnetically longitudinally and extending parallel between one front face and one rear face of the magnet pole and connected together, characterized in that a first group of single magnets has a larger cross-section or a cross-section of a different shape than at least one second group of at least one single magnet, the single magnets of the first group being more numerous than those of the at least one single magnet of said at least one second group.

The magnet pole has a predetermined volume and configuration defined by its subsequent utilization, i.e. its positioning in a rotor.

For a given predetermined configuration, it is not always possible to construct an assembly of single magnets that is as large as possible in the interior of the magnet pole because the single magnets cannot be located in the space remaining on the edge of the assembly of single magnets in the magnet pole.

This invention provides for the use of at least two groups of single magnets. The first group, which is larger, comprises magnets with a first cross-section and/or a first shape and the second group, or possibly other additional groups, comprise one or more magnets with a different cross-section and/or a different shape, advantageously a smaller cross-section.

For example, it is possible but not obligatory to use in the first group single magnets with a square cross-section and one or more magnets of the other groups with a differently shaped cross-section or a different cross-section that can be inserted in particular on the edges of the assembly of single magnets. Therefore the magnet pole can be filled with more single magnets of different cross-sections adapted to the required configuration of the magnet pole.

A smaller cross-section or a more specific shape, for example triangular, of a single magnet of the second group that differs from that of a single magnet of the first group makes it possible to insert this single magnet of the second group in a space in which a single magnet of the first group would not fit.

It is the shape or the dimensions of the cross-section of the single magnets that plays a role, and not their length, which does not change. The front and rear surfaces of a magnet pole of this type are designed to each fit flush over one of the faces of the rotor carrying them and the lengths of the single magnets can extend in the thickness direction of the rotor.

A rotor has cavities or the insertion of a respective magnet pole. It follows that the magnet pole or each magnet pole must have a predetermined shape that fits the cavity.

This predetermined shape could not be filled in an optimal manner by single magnets with a single type of shape or a single cross-section dimension. The present invention, by proposing single magnets of different cross-section shapes, for example square, ovoid, triangular, trapezoidal or other shapes, these cross-sections can have more or less small dimensions that make it possible to adapt the assembly of single magnets thus constituted to the internal dimensions of the magnet pole of a predetermined shape.

The single magnets are advantageously connected to one another to form an assembly of magnets, whereby a cross-section of the assembly of magnets corresponds to a cross-section of the front or rear face of the magnet pole and is smaller than it by less than 15%.

Two contradictory requirements must be satisfied. The first requirement is to ensure the retention of the single magnets in the magnet pole or in each magnet pole, and the second requirement is to insert as many single magnets as possible in the magnet pole or in each magnet pole. It has been determined that a filling of the interior of the magnet poles by more than 85% is the optimal response to these two contradictory requirements.

Advantageously, the at least one magnet of the at least one second group is inserted locally on the periphery of the assembly of single magnets.

This optional and non-obligatory characteristic makes it possible to precisely adjust the filling of the magnet pole, taking its shape into consideration and adding single magnets of a smaller size or a shape that is better adapted to the internal shape of the magnet pole.

The single magnets of the first group advantageously form series of single magnets aligned in two perpendicular directions and the single magnets of the at least one second group, when the number of single magnets of said at least one second group is greater than one, form series of single magnets aligned in at least one direction, and are optionally associated two-by-two perpendicular to said direction or are positioned in isolation in the magnet pole.

This makes possible a better retention of the magnets by creating a grid layout and an ease of fabrication of the assembly of single magnets, and consequently of the magnet pole housing an assembly of this type.

The single magnets advantageously have an ovoid shape or the cross-sections of the single magnets are rectangular, square, triangular, circular, trapezoidal or polygonal, the shapes of said at least one single magnet of said at least one second group optionally being different from the shapes of the single magnets of the first group.

It is possible to use multiple configurations to adapt to the internal shape of the predetermined magnet pole for their insertion into a cavity of the rotor.

The single magnets can therefore all be of the same shape, for example a more or less small square cross-section, or all different, for example having a square, triangular or ovoid cross-section, because there can be a plurality of groups of single magnets that have different shapes and different cross-section dimensions.

For example, the face-to-face adhesive connection of the single magnets in the shape of a parallelepiped can contribute to their demagnification and does not allow an exchange of heat with the exterior of the single magnets. This can be prevented by associating the single magnets of the first group with the single magnets of a second group or of another group.

With regard to an ovoid magnet, considering a single magnet as the elementary element in the form of a block, the ideal shape of this block is a symmetrical ellipsoid of revolution, which is also called an ovoid shape, approximately a flattened sphere which, on account of its topology, is difficult to demagnetize because its magnetic field relative to the magnetization is non-uniform. There is no rotating field effect in the corners.

A combination of parallelepiped single magnets, which are easy to fabricate, with ovoid magnets can therefore be very advantageous.

The single magnets are advantageously adhesively connected to one another at least locally, or the single magnets are housed in a mesh structure that has first cavities corresponding to the cross-sections of the single magnets of the first group and at least second cavities corresponding to the cross-sections of the single magnets of said at least one second group.

A mesh structure has the advantage that it makes possible a prior retention of the single magnets in the magnet pole and strengthening their final hold, while having the disadvantage of slightly reducing the surface area of the single magnets of the magnet pole.

An adhesive connection of the single magnets among themselves, possibly less strong than an adhesive connection associated with the mesh structure, nevertheless offers a certain flexibility, because this adhesive connection between single magnets can only be partial, which has unexpected effects. This can be very advantageous for longitudinally poly-faceted single magnets.

In this case, the objective is not to adhesively connect the single magnets face-to-face but only locally on the hollowed-out recesses formed in each single magnet and therefore containing the adhesive, which is advantageously in the form of resin.

These contact areas can be spots, lines, or circular arcs, depending on the exterior contour of the single magnets. It is the adhesive contained in these recesses that forms the adhesive connection of two adjacent single magnets. The result is therefore single magnets in the form of "crystals" associated with one another which are not connected over the entire surface of their facets or longitudinal faces. On the contrary, layers of resin and adhesive are replaced, for example, on at least one longitudinal extremity to construct a mesh network on the extremities of the poly-faceted blocks in the form of single magnets with limited zones of contact between magnets.

The magnet pole advantageously has an external shape with front and rear faces having a trapezoidal, triangular or circular cross-section.

The exterior shape of the magnet pole is principally for its insertion into the rotor, frequently into a cavity for which it is intended.

A layer of composite advantageously at least partly coats the magnet pole. This reinforces the magnet pole thus constituted.

The invention further relates to a fabrication process for at least one such magnet pole from a magnet block forming a blank, wherein the magnet pole must have a predetermined cross-section, characterized in that the blank is cut in several directions to delimit, on one hand, single magnets of the first group and, on the other hand, at least one single magnet of said at least one second group, the single magnets being connected to one another by adhesive, at least locally, with the optional interposition of a mesh structure between the single magnets to form an assembly of single magnets forming a magnet pole.

The principal problem encountered in the fabrication of a magnet pole of this type is the adaptation of the assembly of single magnets to the predetermined shape that the magnet pole must have. This principal problem is solved in that the fabrication process starts with a blank having the shape that the assembly of single magnets must have.

Instead of adding single magnets to an assembly to adapt it to the predetermined internal shape of the magnet pole, less the space necessary to ensure its retention by at least an adhesive connection, this invention provides for starting with a blank that takes this predetermined internal shape into consideration and cutting this blank into single magnets.

Therefore there is no longer any adaptation of the assembly of single magnets to the predetermined internal shape at the end of fabrication, the assembly of single magnets being designed starting with a blank and having previously taken this predetermined internal shape of the magnet pole into consideration.

This process achieves an ease of fabrication and the realization of an assembly of single magnets that correctly fit the predetermined internal shape of the magnet pole. It is not necessary to perform a filling of the magnet pole by the successive installation of single magnets with a positioning of the single magnets that is difficult to achieve.

On the contrary, according to this invention, these single magnets are obtained directly during the cutting of the blank and the assembly of single magnets is constituted just after the cutting of the blank.

During a given cutting operation it is possible to fabricate a plurality of magnet poles simultaneously, these magnet poles then being cut into individual sections according to a preferred embodiment of this invention.

The blank is advantageously previously configured to the dimensions of and cut into single magnets of the first group and into at least one single magnet of the second group so that the assembly of single magnets has a cross-section corresponding to a cross-section of the front or rear surface of the magnet pole, being smaller than it by less than 15%.

The cutting is advantageously done by wire, electrical discharge machining, milling or very high-pressure water jet cutting.

When at least two magnet poles are fabricated from the blank, the cut blank with the single magnets joined together is advantageously cut into said at least two magnet poles.

This process makes possible a simplification of the simultaneous fabrication of a plurality of magnet poles.

The invention finally relates to a rotor for an axial flux electromagnetic machine, characterized in that it contains at least one magnet pole, the single magnets extending axially in relation to the rotor in the thickness direction of the rotor, the rotor being in the form of a disk with the front face of said at least one magnet pole piercing one face of the disc, and the rear face of said at least one magnet pole piercing the opposite face of the disc.

A periphery of the rotor is advantageously formed by a layer of composite coating, which can optionally be fiber-reinforced.

In this case, three types of coating or adhesive connections can be combined. A first adhesive connection ensures the connection of the single magnets to one another. A second coating relates to a magnet pole considered as an entity and a third coating, advantageously fiber-reinforced, relates to the rotor that carries the magnet pole or poles. A rotor of this type is therefore mechanically solid and can withstand high speeds of rotation while having an optimal magnetized surface.

An additional advantage is that the use of a magnet pole with a plurality of single magnets reduces the heat released compared to a large magnet of similar size. It would then be possible to use cover membranes or discs on the faces of the rotor which are made of composite material instead of iron without the risk of destruction of the coatings by heat. Nevertheless, the division of the magnet pole into multiple single magnets has the disadvantage of reducing the useful magnetic surface area and therefore reducing the torque produced. Optimizing the filling of a magnet pole by the largest possible number of single magnets as proposed by the present invention therefore makes it possible to use lighter-weight cover membranes while preserving the same torque generated by increasing the number of individual magnets per magnet pole. Lighter-weight skins will also make the rotor more efficient, which results in synergy at the level of output of the electromagnetic machine equipped with a rotor of this type.

The present invention further relates to an axial flux electromagnetic machine comprising at least one rotor of this type associated with at least one stator, for example, although without being restrictive, a machine equipped with two stators and one rotor or two rotors each surrounded by two stators.

BRIEF DESCRIPTION OF THE FIGURES

Additional characteristics, objectives and advantages of the present invention are described in greater detail below and with reference to the accompanying drawings which illustrate non-restricting examples, and in which.

All the accompanying figures are intended to be considered in combination and reference may be made in the following description of a figure to reference numbers that are found on one of the other figures.

A single magnet of a first or a second group is referenced in the figures, although what is said about the single magnet in question is valid for all the single magnets of the same group. The same is true for a single magnet pole referenced in FIGS. 1, 3, 5 and 7.

DETAILED DESCRIPTION OF THE INVENTION

Figure 1:
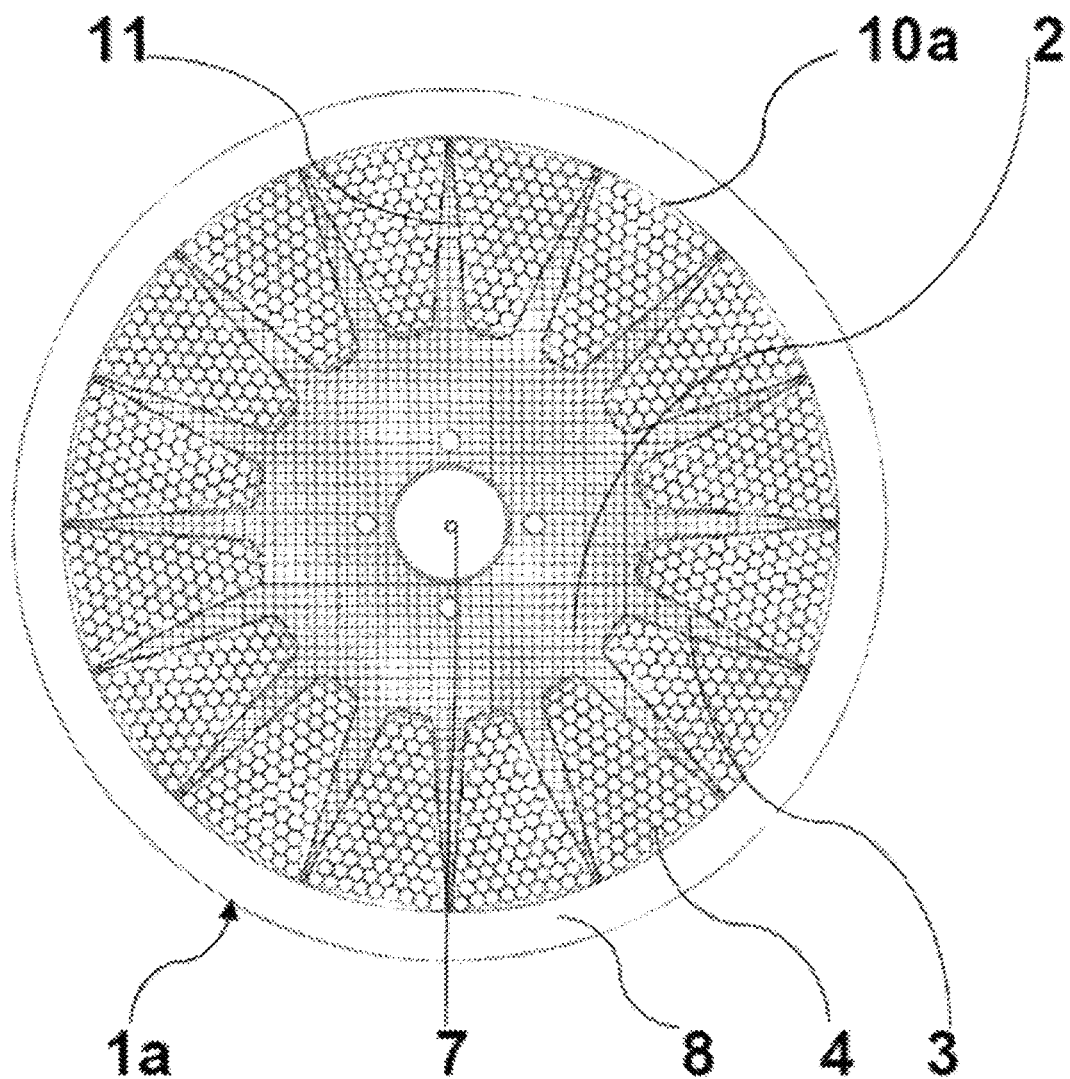
FIG. 1 is a schematic representation of a front view of a rotor intended for an axial flux electromagnetic machine of the prior art, wherein the rotor carries magnet poles constituted by a plurality of individual magnets, with empty single magnet spaces remaining in each magnet pole.

FIG. 1 shows a rotor 1a of the prior art. The rotor 1a has branches 3 enclosing between them a magnet pole 10a constituted by a plurality of polygonal single magnets 4. A rotor 1a of this type is used in an electromagnetic motor or generator, advantageously an axial flux motor or generator.

The rotor 1a, which is advantageously essentially circular in the form of a ring, has a body comprising an internal hub 2 concentric with a central axis of rotation 7 of the rotor 1a or longitudinal median axis of the rotor 1a. Branches 3 extend radially into the rotor 1a with reference to the central axis of rotation 7 from the internal hub 2 toward a rotor binding 8 forming a circular external periphery of the rotor 1a.

The hub 2 and the branches 3 are in one piece and form a rotor body 2, 3. At least one magnet pole 10a comprising a plurality of small single magnets 4 grouped to form a bundle is housed in each space delimited between two adjacent branches 3.

According to the conventional definition, a bundle is an assembly of similar elements, i.e. in the present case an assembly of single magnets, with an elongated shape and bound together.

In all the figures accompanying the present application, the single magnets 4 are always similar and are grouped into a bundle forming a packet of single magnets and are not similar each to a magnetic bar.

FIG. 1 shows that empty spaces remain in the magnet pole 10a for single magnets. One of these spaces is identified as 11 in FIG. 1, although of course there are a plurality of the spaces in each magnet pole 10a. These spaces 11 are filled by connecting means of the single magnets 4 to one another and reduce the magnetic power of each magnet pole 10a.

With reference to FIGS. 2 to 7, the present invention relates to a magnet pole formed by a plurality of single magnets 4, 4a to 4g which are elongated, grouped into a bundle and are oriented magnetically longitudinally and extend parallel between a front face and a rear face of the magnet pole, and are connected to one another and can be perpendicular to the front and rear faces.

The front and rear faces are intended to be carried by a respective face of a disc-shaped rotor, the single magnets extending along the thickness direction of the rotor.

One or more large magnets are therefore broken down into a plurality of small or micro-magnets. A magnet with large dimensions is subject to losses from Foucault currents greater than its equivalent in small or micro-magnets. The use of small or micro-magnets therefore makes it possible to reduce these losses, which are prejudicial to the functioning of the rotor.

This was known from the closest prior art.

According to the invention, a first group of single magnets 4 has a larger cross-section or a cross-section of a different shape than at least one second group of at least one single magnet 4a to 4g. The single magnets 4 of the first group are more numerous than the single magnet or magnets 4a to 4g of the second group or of groups other than the first group.

This makes it possible to obtain an assembly of single magnets with dimensions and a shape that more closely matches the internal shape of the magnet pole that is to be achieved. By using single magnets 4 of the first group, it would not have been possible to complete the assembly, which would then have exceeded the required dimensions of the internal shape of the magnet pole 10.

It is necessary, however, to leave unoccupied in the magnet pole 10, at the time of its fabrication, sufficient space to ensure the retention of the single magnets among themselves, whether they are part of the first group or another group.

The single magnets 4, 4a to 4g can also be connected to form an assembly of magnets, whereby one section of the assembly of magnets corresponding to a section of the front face or the rear face of the magnet pole 10 is smaller than it by less than 15%.

Thus the single magnets 4, 4a to 4g occupy practically more than 85% of the magnet pole 10. The percentage of 85% depends on the connection means employed and the specifications that must be satisfied by the rotor, for example being capable of rotating at very high speeds, in which case the space reserved for the connection means, principally by means of adhesive and/or a mesh structure, can be increased to increase the strength of the rotor.

The single magnets 4a to 4g of the second group or of groups other than the first group can be inserted locally on the periphery of the assembly of single magnets. This is shown in the accompanying figures, but is not obligatory. Likewise, all the embodiment shapes shown in FIGS. 2 to 7 are not restricting and other embodiment shapes may exist.

For example, in FIGS. 2 to 7 the groups of single magnets other than the first group are positioned toward the periphery of the magnet pole 10, but this arrangement, although advantageous, is not obligatory. These other groups can also be distributed in the magnet pole 10 and even broken down into subgroups distributed differently in the magnet pole 10.

In FIGS. 2 to 7, the single magnets 4 of the first group are shown with a rectangular or square cross-section; although this cross-section is preferred, it is not obligatory.

Figure 2:
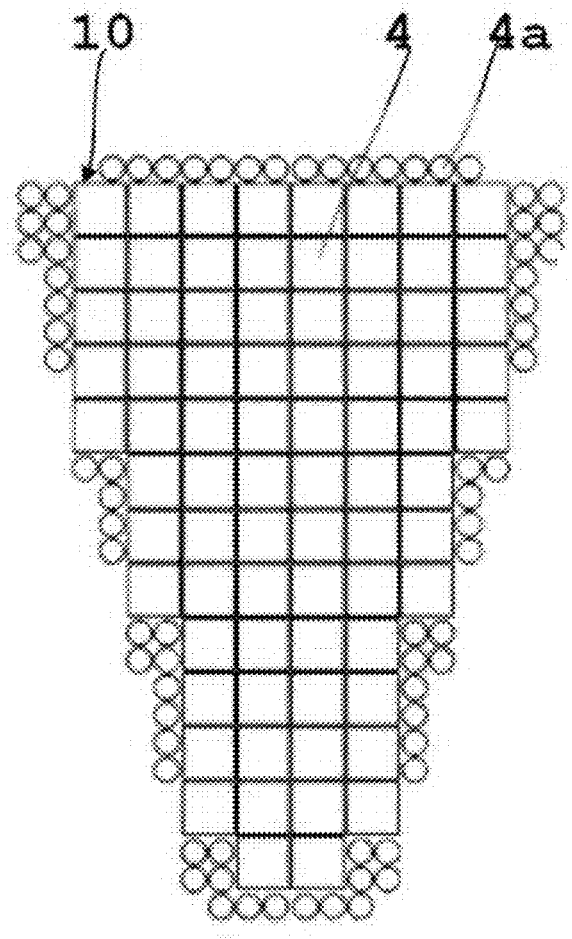
FIG. 2 shows a magnet pole with a plurality of single magnets according to a first embodiment of the present invention, wherein a first group of single magnets has a square cross-section and a second group of single magnets consists of single magnets with a circular cross-section, for example ovoid single magnets, the cross-section of the magnets of the second group being smaller than the cross-section of the magnets of the first group.
Figure 3:
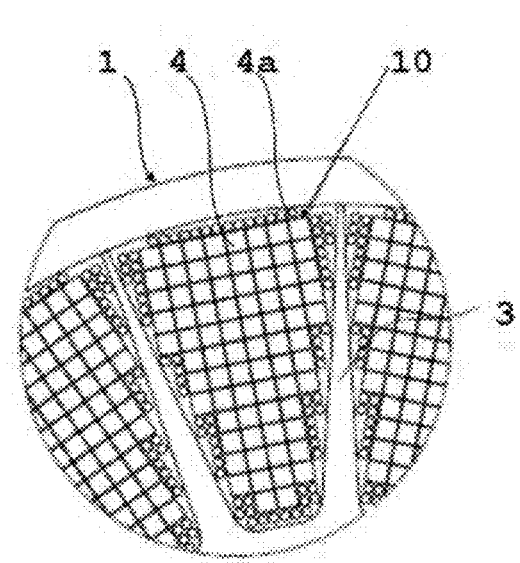
FIG. 3 shows an enlarged detail of a branched rotor according to a first embodiment of the present invention, the rotor having magnet poles identical to the one shown in FIG. 2.

In FIGS. 2 and 3, the single magnets 4 of the first group have a square cross-section and the single magnets 4a of the second group have a circular cross-section. These single magnets 4a of the second group can be ovoid or cylindrical, for example.

Figure 4:
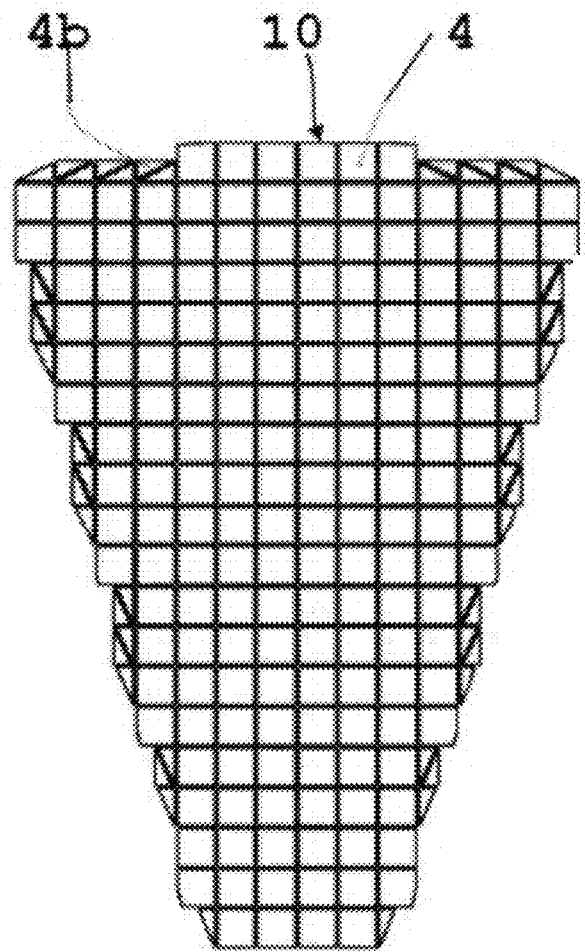
FIG. 4 shows a magnet pole with a plurality of single magnets according to a second embodiment of the present invention, a first group of single magnets having a square cross-section and a second group of single magnets having a triangular cross-section, the cross-section of the magnets of the second group being smaller than the cross-section of the magnets of the first group.
Figure 5:
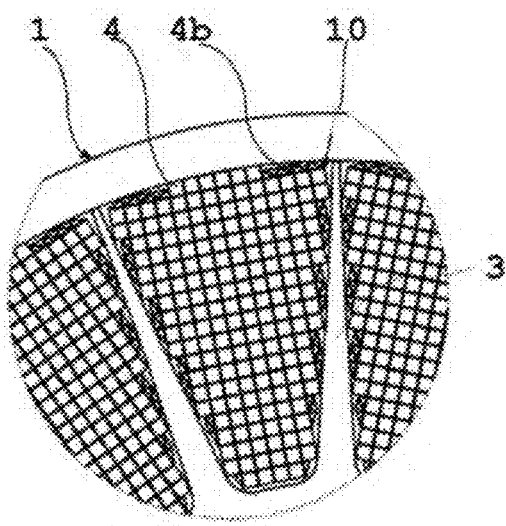
FIG. 5 shows an enlarged detail of a branched rotor according to a second embodiment of the present invention, wherein the rotor houses magnet poles identical to the one shown in FIG. 4.

In FIGS. 4 and 5, the single magnets 4 of the first group have a square cross-section and the single magnets 4b of the second group have a triangular cross section.

The single magnets 4b of the second group can, for example, be grouped two-by-two to form a rectangular cross-section, advantageously square, or can be considered in isolation as illustrated toward a tip of the magnet pole 10 in FIG. 5.

Figure 6:
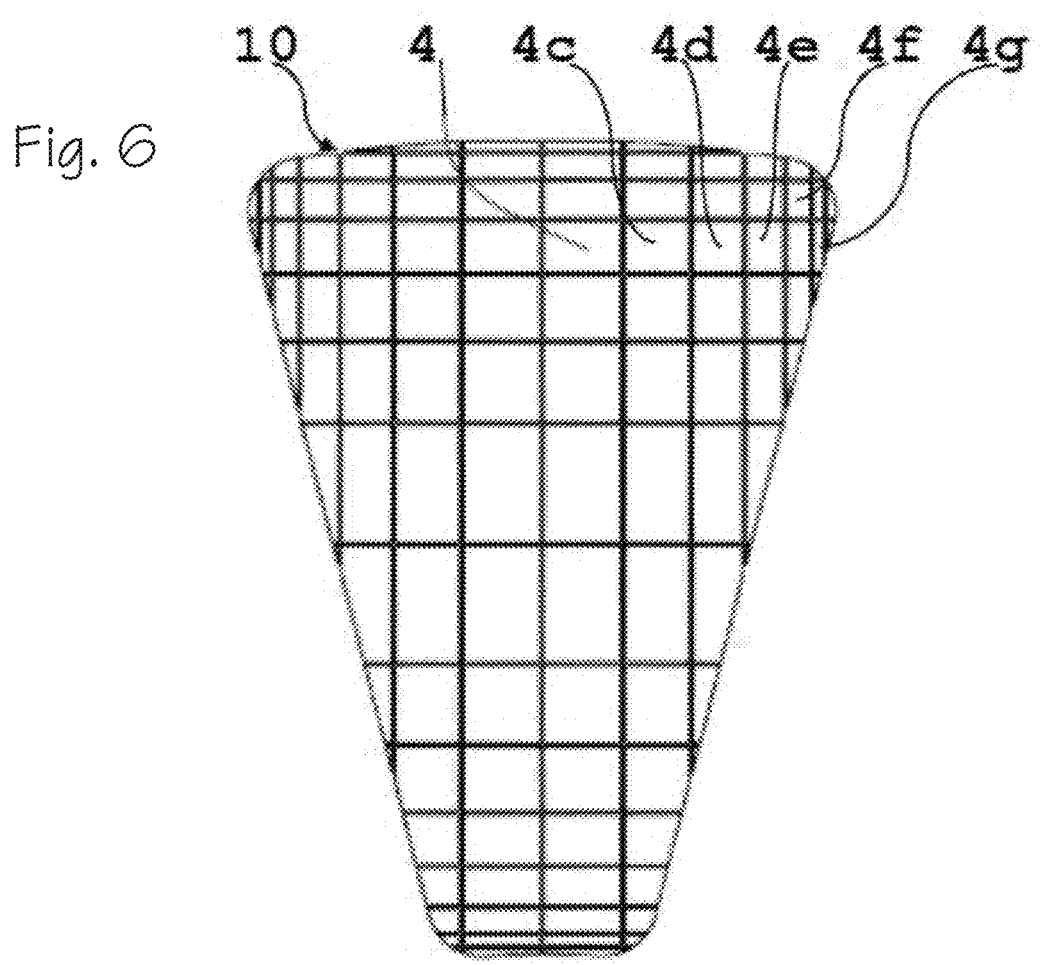
FIG. 6 shows a magnet pole with a plurality of single magnets according to a third embodiment of the present invention, a first group of single magnets having a square or rectangular cross-section and a second group of single magnets having a rectangular cross-section, the cross-section of the magnets of the second group being smaller than the cross-section of the magnets of the first group.
Figure 7:
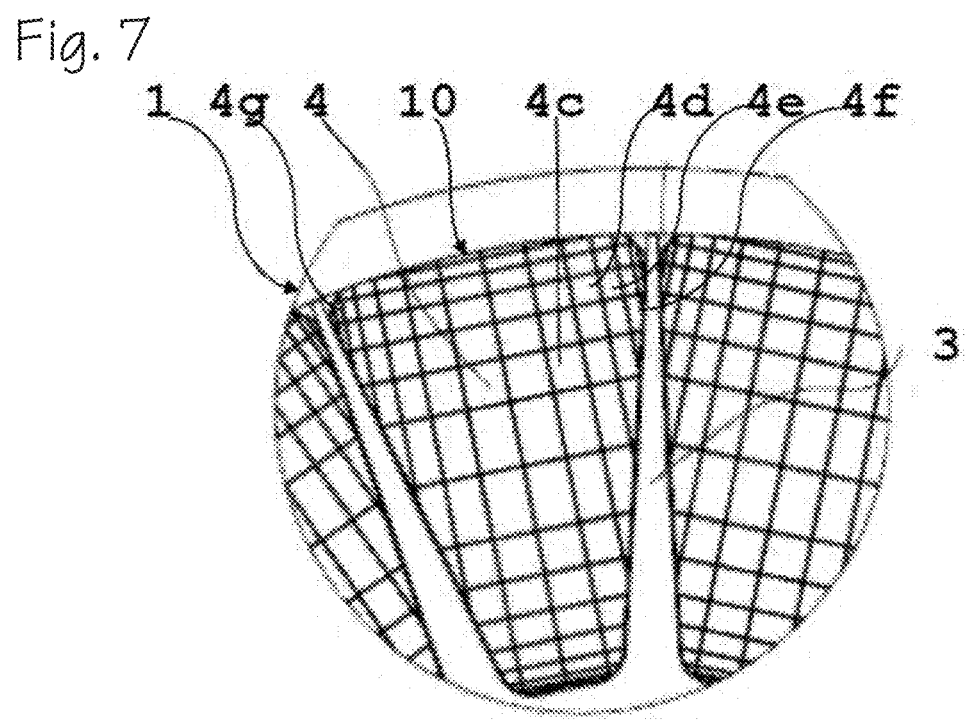
FIG. 7 shows an enlarged section of a branched rotor according to a third embodiment of the present invention, wherein the rotor housing the magnet poles is identical to the one shown in FIG. 6.

In FIGS. 6 and 7, the single magnets 4 of the first group have a rectangular or square cross-section and there are more than two groups of single magnets. It is possible to distinguish five groups of single magnets 4c, 4d, 4e, 4f and 4g in addition to the first group of single magnets 4, only one single magnet being identified for each group.

It is therefore possible to consider that the first group can be separated into two subgroups, one subgroup comprising single magnets with a square cross-section, this subgroup being placed toward the middle of the width and in the top and bottom parts of the length of the magnet pole 10 in FIG. 6, and another subgroup comprising single magnets with a rectangular cross-section, this subgroup being placed in the middle of the width and the length of the magnet pole 10, i.e. in the central part of the magnet pole 10.

The single magnets 4c, 4d, 4e, 4f and 4g of the five groups have a smaller rectangular cross-section than that of the single magnets 4 of the first group, decreasing to a greater extent as the group other than the first group approaches the edges of the assembly of single magnets 4, 4c to 4g thus formed.

Certain of the single magnets 4c, 4d, 4e, 4f and 4g of a given group other than the first group can be truncated in relation to the single magnets of the same group, to better fit the internal configuration of the magnet pole 10 that contains them.

As shown in FIGS. 2 to 7 and with reference to these figures considered in combination, the single magnets 4 of the first group can form series of single magnets aligned in two perpendicular directions.

When a number of single magnets 4a to 4g of the second group or of groups other than the first group is greater than one, the single magnets 4a to 4g of the second group or of groups other than the first group can form series of single magnets aligned in at least one direction, optionally grouped two-by-two as shown in FIGS. 4 and 5, or being housed individually in the assembly of single magnets.

The single magnets 4, 4a to 4g of all the groups can have an ovoid shape, or the cross-sections of the single magnets 4, 4a to 4g can have a rectangular, square, triangular, circular, trapezoidal or polygonal shape.

In all cases, the shapes of the single magnet or magnets 4a to 4g of the second group or of groups other than the first group can optionally be different from the shapes of the single magnets 4 of the first group.

In a first optional configuration, the single magnets 4, 4a to 4g of all the groups can be adhesively connected to one another, at least locally.

In a second optional configuration, the single magnets 4, 4a to 4g of all the groups can be housed in a mesh structure having first cavities corresponding to the cross-sections of the single magnets 4 of the first group and at least second cavities corresponding to the cross-sections of the single magnets 4a to 4g of the second group or of groups other than the first group.

The magnet pole 10 can have an exterior shape with front and rear faces having a trapezoidal, triangular or circular cross-section. The above feature is not restricting. FIGS. 2 to 7 show a trapezoidal front face.

A layer of composite can coat the magnet pole 10 at least partly to strengthen it.

The invention further relates to a fabrication method for at least one magnet pole 10 of the type described above from a magnet block forming a blank, wherein the magnet pole 10 must have a predetermined cross-section.

In this method, the blank is cut in a plurality of directions to delimit, on one hand, single magnets 4 of the first group and, on the other hand, at least one single magnet 4a to 4g of the second group or of groups other than the first group.

The single magnets 4, 4a to 4g are then connected to one another by adhesive at least locally with the optional interposition of a mesh structure between the single magnets 4, 4a to 4g to form an assembly of single magnets forming the magnet pole 10. The mesh structure is not preferred, given that the single magnets 4, 4a to 4g are already positioned in the assembly of single magnets because they originate from the blank cut as described above.

The blank can be previously configured to the proper dimensions and cut into single magnets 4 of the first group and into at least one single magnet 4a to 4g of the second group so that the assembly of single magnets has a cross-section corresponding to a cross-section of the front or rear face of the magnet pole 10, being smaller than it by less than 15%.

The cutting can be performed by wire, electrical discharge machining, milling or very high-pressure water jet cutting.

In one preferential embodiment, when at least two magnet poles 10 are fabricated from the blank, the cut blank with the connected single magnets 4, 4a to 4g is sectioned into said at least two magnet poles 10.

The dimensions and the shape of the blank therefore take into account the dimensions and the shapes of at least two magnet poles 10 fabricated simultaneously.

The invention finally relates to a rotor 1 for an axial flux electromagnetic machine. This rotor 1 is identical to a rotor of the prior art shown in FIG. 1, with the difference that it comprises magnet poles 10 as described above and some of which are illustrated in FIGS. 2 to 7

The rotor 1 houses at least one magnet pole 10, the single magnets 4, 4a to 4g extending axially to the rotor 1 in a thickness direction of the rotor 1.

The rotor 1 is in the shape of a disk with the front face of said at least one magnet pole 10 piercing one face of the disc and the rear face of said at least one magnet pole 10 piercing the opposite face of the disc.

FIG. 1 describes a rotor 1a with branches 3 and circled by a rotor binding 8, although these characteristics are only optional. The same is true for the hub 2.

Advantageously but not restrictively, a periphery of the rotor 1 can be formed by a layer of composite coating optionally reinforced with fibers, with the optional insertion of a cover membrane for each face of the rotor 1.

The rotor 1 can be part of an axial flux electromagnetic machine associated with one or more stators. There can also be a plurality of rotors in the electromagnetic machine.

The invention is by no means limited to the embodiments described and illustrated, which are presented only by way of example.

The invention claimed is:

1. A fabrication method of at least one magnet pole (10) from a magnet block forming a blank, wherein
    said at least one magnet pole is formed by a plurality of elongated single magnets (4, 4a to 4g) grouped to form a bundle, oriented magnetically longitudinally and extending parallel between a front face and a rear face of the magnet pole (10) and being connected to one another, characterized in that a first group of single magnets (4) has a larger cross-section or a cross-section of a different shape than at least one second group of at least one single magnet (4a to 4g), the single magnets (4) of the first group being more numerous than said at least one single magnet (4a to 4g) of said at least one second group; wherein
    the magnet pole (10) must have a predetermined cross-section, characterized in that the blank is cut along several directions to delimit, on one hand, single magnets (4) of the first group and, on the other hand, at least one single magnet (4a to 4g) of said at least one second group, the single magnets (4, 4a to 4g) being connected to one another by adhesive, at least locally, optionally with the interposition of a mesh structure between the single magnets (4, 4a to 4g) to form an assembly of unit magnets forming a magnet pole (10); in which
    the blank is previously configured to the proper dimensions and cut into single magnets (4) of the first group and into at least one single magnet (4a to 4g) of the second group so that the assembly of single magnets (4, 4a to 4g) has a cross-section corresponding to a cross-section of the front or rear face of the magnet pole (10), being smaller than one of the front or rear face of the magnet pole (10) by less than 15%.

2. A method according to claim 1, in which the cutting is done by wire, electrical discharge machining, milling or very high-pressure water jet cutting.

3. The method of claim 1 further comprising the step of connecting the single magnets to one another to form an assembly of magnets, whereby one section of the assembly of magnets corresponding to one of a section of the front face or a section of the rear face of the magnet pole (10) is smaller than the other.

4. The method of claim 1 in which said at least one single magnet (4a to 4g) of said at least one second group is disposed along a periphery of the assembly containing all of the single magnets (4, 4a to 4g) of the magnet pole (10).

5. The method of claim 1 in which the single magnets (4) of the first group form a series of single magnets aligned in two perpendicular directions and the single magnets (4a to 4g) of said at least one second group, when a number of single magnets (4a to 4g) of said at least one second group is greater than one, form a series of single magnets aligned in at least one direction.

6. The method of claim 1 further comprising the step of adhesive connecting the single magnets to one another.

7. The method of claim 1 further comprising the step of housing single magnets in a mesh that has first cavities corresponding to the cross-sections of the single magnets (4) of the first group and at least second cavities corresponding to the cross-sections of the single magnets (4a to 4g) of said at least one second group.

8. The method of claim 1 further comprising the step of coating the magnet poles (10) with a layer of composite.

9. A fabrication method of at least two magnet poles (10) from a magnet block forming a blank, wherein
    said at least two magnet poles are formed by a plurality of elongated single magnets (4, 4a to 4g) grouped to form a bundle, oriented magnetically longitudinally and extending parallel between a front face and a rear face of each of the two magnet poles (10) and being connected to one another, characterized in that a first group of single magnets (4) has a larger cross-section or a cross-section of a different shape than at least one second group of at least one single magnet (4a to 4g), the single magnets (4) of the first group being more numerous than said at least one single magnet (4a to 4g) of said at least one second group; wherein
    each of the two magnet poles (10) has a predetermined cross-section, characterized in that the blank is cut along several directions to delimit, on one hand, single magnets (4) of the first group and, on the other hand, at least one single magnet (4a to 4g) of said at least one second group, the single magnets (4, 4a to 4g) being connected to one another by adhesive with the interposition of a mesh structure between the single magnets (4, 4a to 4g) to form an assembly of unit magnets forming a magnet pole (10); in which,
    the at least two magnet poles (10) are fabricated from the blank, and the single magnets (4, 4a to 4g) of the first group and the at least one single magnet of the second group are assembled into said at least two magnet (10) poles.

10. A method according to claim 9, in which the cutting is done by wire, electrical discharge machining, milling or very high-pressure water jet cutting.

11. The method of claim 9 further comprising the step of connecting the single magnets to one another to form an assembly of magnets, whereby one section of the assembly of magnets corresponding to one of a section of the front face or a section of the rear face of the magnet pole (10) is smaller than the other.

12. The method of claim 9 in which said at least one single magnet (4a to 4g) of said at least one second group is disposed along a periphery of the assembly containing all of the single magnets (4, 4a to 4g) of the magnet pole (10).

13. The method of claim 9 in which the single magnets (4) of the first group form a series of single magnets aligned in two perpendicular directions and the single magnets (4a to 4g) of said at least one second group, when a number of single magnets (4a to 4g) of said at least one second group is greater than one, form a series of single magnets aligned in at least one direction.

14. The method of claim 9 further comprising the step of adhesive connecting the single magnets to one another.

15. The method of claim 9 further comprising the step of housing single magnets in a mesh that has first cavities corresponding to the cross-sections of the single magnets (4) of the first group and at least second cavities corresponding to the cross-sections of single magnets (4a to 4g) of said at least one second group.

16. The method of claim 9 further comprising the step of coating the magnet poles (10) with a layer of composite.

\* \* \* \* \*